US012025054B2

(12) United States Patent
Mailander (10) Patent No.: US 12,025,054 B2
(45) Date of Patent: Jul. 2, 2024

(54) PUMP MIXER SEPARATOR UNIT

(71) Applicant: General Electric Company, Schenectady, NY (US)

(72) Inventor: William James Mailander, Beverly, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/376,184

(22) Filed: Apr. 5, 2019

(65) Prior Publication Data
US 2020/0318539 A1    Oct. 8, 2020

(51) Int. Cl.
*F02C 3/30*    (2006.01)
*F02C 7/22*    (2006.01)

(52) U.S. Cl.
CPC .................. *F02C 3/30* (2013.01); *F02C 7/22* (2013.01); *F05D 2220/323* (2013.01); *F05D 2260/607* (2013.01)

(58) Field of Classification Search
CPC ...... F02C 7/236; F02C 3/30; F05D 2210/132; F05D 2260/601; B01D 3/343; B01D 2257/104; F01M 2013/0422
See application file for complete search history.

(56) References Cited

U.S. PATENT DOCUMENTS 2,368,530 A * 1/1945 Edwards ................. F04D 9/002
                                                        415/143
4,339,917 A * 7/1982 LaGrone ................. F02C 7/236
                                                        137/565.32

(Continued)

FOREIGN PATENT DOCUMENTS

CA    2488316    7/2005
CA    2568551    7/2007
(Continued)

OTHER PUBLICATIONS

European Patent Office, "Extended European Search Report," issued in connection with European Patent Application No. 20155386.4, dated Aug. 11, 2020, 9 pages.
(Continued)

*Primary Examiner* — Gerald L Sung
*Assistant Examiner* — Jacek Lisowski
(74) *Attorney, Agent, or Firm* — Hanley, Flight & Zimmerman, LLC (57) ABSTRACT

A pump mixer separator unit is provided in communication with a stripping gas line that provides an inlet stripping gas flow and a fuel line that provides an inlet fuel flow. The pump mixer separator unit includes a first pump in fluid communication with the stripping gas line and the fuel line to form a fuel/gas mixture flow and generate a first pressure rise from the inlet fuel flow to the fuel/gas mixture flow; and a second pump in fluid communication with the first pump, wherein the second pump receives the fuel/gas mixture flow from the first pump, wherein the second pump separates the fuel/gas mixture flow into an outlet stripping gas flow and an outlet fuel flow and generates a second pressure rise from the fuel/gas mixture flow to the outlet fuel flow, wherein the first pump includes a supplemental pump feature for drawing an inlet fuel flow through the fuel line during operation.

15 Claims, 5 Drawing Sheets

(56) References Cited

U.S. PATENT DOCUMENTS

| | | | |
|---|---|---|---|
| 5,545,014 A * | 8/1996 | Sundberg | F01C 21/0863 |
| | | | 418/268 |
| 5,873,235 A | 2/1999 | Bosley et al. | |
| 7,093,437 B2 | 8/2006 | Spadaccini et al. | |
| 7,231,768 B2 | 6/2007 | Spadaccini et al. | |
| 8,324,746 B2 | 12/2012 | Bradbrook | |
| 9,724,625 B2 | 8/2017 | Lo | |
| 9,834,315 B2 | 12/2017 | Lo et al. | |
| 9,885,287 B2 | 2/2018 | Striker et al. | |
| 9,897,100 B2 | 2/2018 | Laboda et al. | |
| 2005/0211096 A1 | 9/2005 | Burlatsky et al. | |
| 2008/0095681 A1 * | 4/2008 | Koenig | B01D 53/229 |
| | | | 210/151 |
| 2009/0211558 A1 * | 8/2009 | Anson | F02C 7/236 |
| | | | 123/497 |
| 2013/0186097 A1 | 7/2013 | Hains | |
| 2013/0320148 A1 | 12/2013 | Lewis | |
| 2016/0167802 A1 | 6/2016 | Lo et al. | |
| 2016/0305440 A1 | 10/2016 | Laboda et al. | |
| 2017/0009773 A1 * | 1/2017 | Marenco | F04D 1/06 |
| 2017/0056789 A1 | 3/2017 | Lo | |
| 2017/0167374 A1 | 6/2017 | Klosinski | |
| 2019/0047721 A1 | 2/2019 | Rheaume et al. | |

FOREIGN PATENT DOCUMENTS

| | | |
|---|---|---|
| CN | 1308189 A | 8/2001 |
| CN | 101069005 | 11/2007 |
| CN | 101776015 | 7/2010 |
| CN | 103216337 A | 7/2013 |
| CN | 106979073 A | 7/2017 |
| CN | 206592211 | 10/2017 |
| CN | 109018387 | 12/2018 |
| EP | 1362984 A2 | 11/2003 |
| EP | 1775514 | 4/2007 |
| EP | 3023518 | 5/2016 |
| EP | 3315411 | 5/2018 |
| FR | 2310789 | 12/1976 |
| GB | 787997 A | 12/1957 |
| GB | 932386 A | 7/1963 |
| WO | 9948588 | 9/1999 |

OTHER PUBLICATIONS

Chinese Patent Office, "First Office action," issue in connection with Chinese patent application No. 202010078433.4, dated Sep. 13, 2022, 26 pages.

Huang Si et al., "Numerical Analysis of Gas-Liquid Two-Phase Flow in Multiphase Rotodynamic Pump and Pump Performance," Journal of South China University of Technology (Natural Science Edition), vol. 35 No. 12, Dec. 2007, 12 pages. [English Machine Translation Included].

Li Yazhou et al., "Overview and Development Trend of Fuel-air Venturi Mixer," China Special Equipment Safety, No. 03, DOI: 10.3969/j.issn.1673-257X.2018.03.022, 14 pages. [English Machine Translation Included].

China National Intellectual Property Administration, "Notice of Allowance," issued in connection with Chinese Patent Application No. 202010078433.4, dated May 9, 2023, 7 pages. [English Translation Included].

* cited by examiner

PUMP MIXER SEPARATOR UNIT

FEDERALLY SPONSORED RESEARCH

This invention was made with government support under contract number W911W6-17-2-000 awarded by the U.S. Army. The U.S. government may have certain rights in the invention.

FIELD

The present subject matter relates generally to a pump mixer separator unit for an engine and a method of operating the same.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose.

However, the inventor of the present disclosure has found that the inclusion of such systems may include multiple separate components that increase the cost and weight of such systems. Additionally, the inventor of the present disclosure has found that such systems may be difficult to include in aeronautical engines utilizing a sub-ambient pressure fuel supply, such as in helicopter engines.

BRIEF DESCRIPTION

Aspects and advantages of the invention will be set forth in part in the following description, or may be obvious from the description, or may be learned through practice of the invention.

In one exemplary embodiment of the present disclosure, a pump mixer separator unit is provided in communication with a stripping gas line that provides an inlet stripping gas flow and a fuel line that provides an inlet fuel flow. The pump mixer separator unit includes a first pump in fluid communication with the stripping gas line and the fuel line to form a fuel/gas mixture flow and generate a first pressure rise from the inlet fuel flow to the fuel/gas mixture flow; and a second pump in fluid communication with the first pump, wherein the second pump receives the fuel/gas mixture flow from the first pump, wherein the second pump separates the fuel/gas mixture flow into an outlet stripping gas flow and an outlet fuel flow and generates a second pressure rise from the fuel/gas mixture flow to the outlet fuel flow, wherein the first pump includes a supplemental pump feature for drawing an inlet fuel flow through the fuel line during operation.

In certain exemplary embodiments the first pump includes a first pump gas inlet, a first pump fuel inlet, and a first pump outlet; wherein the first pump gas inlet is in fluid communication with the stripping gas line; and wherein the first pump fuel inlet is in fluid communication with the fuel line.

In certain exemplary embodiments the second pump includes a second pump inlet, a second pump fuel outlet, and a second pump gas outlet; wherein the second pump inlet is in fluid communication with the first pump outlet; wherein the outlet fuel flow exits the pump mixer separator unit at the second pump fuel outlet; wherein the outlet stripping gas flow exits the pump mixer separator unit at the second pump gas outlet; and wherein the second pump inlet receives the fuel/gas mixture flow from the first pump outlet.

In certain exemplary embodiments the pump mixer separator unit further includes a heat exchanger located between the first pump outlet and the second pump inlet.

In certain exemplary embodiments the supplemental pump feature is a jet eductor, and wherein the jet eductor extends from a fuel/gas mixture line fluidly coupled to a first pump outlet to the fuel line at a location upstream of a first pump fuel inlet.

In certain exemplary embodiments the first pump includes an impeller, wherein the impeller mixes the inlet fuel flow with the inlet stripping gas flow to form the fuel/gas mixture flow.

In certain exemplary embodiments the second pump includes a radial impeller that separates the fuel/gas mixture flow into the outlet stripping gas flow and the outlet fuel flow and generates the second pressure rise.

In certain exemplary embodiments the supplemental pump feature is a jet eductor including a jet eductor supply loop that recirculates a portion of the inlet fuel flow downstream of a portion of the first pump back to the fuel line at a location upstream of the first pump.

In certain exemplary embodiments the first pump and the second pump are formed integral to the pump mixer separator unit.

In certain exemplary embodiments the outlet fuel flow has a lower oxygen content than the inlet fuel flow, the outlet fuel flow has a higher pressure than the inlet fuel flow, and the outlet stripping gas flow has a higher oxygen content than the inlet stripping gas flow.

In certain exemplary embodiments the first pump and the second pump are driven by a mechanical source.

In certain exemplary embodiments the first pump and the second pump are driven by an electrical source.

In certain exemplary embodiments the first pump draws in the inlet fuel flow from a sub-ambient pressure fuel supply, and wherein the pump mixer separator unit is for a helicopter engine.

In another exemplary embodiment of the present disclosure, a fuel delivery system for an aeronautical engine is provided. The fuel delivery system includes a supply portion and a pump mixer separator unit. The supply portion includes a stripping gas line that provides an inlet stripping gas flow and a fuel line that provides an inlet fuel flow at a sub-ambient pressure. The pump mixer separator unit includes a first pump in fluid communication with the stripping gas line and the fuel line to form a fuel/gas mixture flow and generate a first pressure rise from the inlet fuel flow to the fuel/gas mixture flow; and a second pump in fluid communication with the first pump, wherein the second pump receives the fuel/gas mixture flow from the first pump, wherein the second pump separates the fuel/gas mixture flow into an outlet stripping gas flow and an outlet fuel flow and generates a second pressure rise from the fuel/gas mixture flow to the outlet fuel flow, wherein the first pump includes a supplemental pump feature for drawing an inlet fuel flow through the fuel line during operation.

In certain exemplary embodiments the first pump includes a first pump gas inlet, a first pump fuel inlet, and a first pump outlet; wherein the first pump gas inlet is in fluid communication with the stripping gas line; wherein the first pump fuel inlet is in fluid communication with the fuel line; wherein the second pump includes a second pump inlet, a second pump fuel outlet, and a second pump gas outlet; wherein the second pump inlet is in fluid communication with the first pump outlet; wherein the outlet fuel flow exits the pump mixer separator unit at the second pump fuel outlet, wherein the outlet stripping gas flow exits the pump mixer separator unit at the second pump gas outlet; and wherein the second pump inlet receives the fuel/gas mixture flow from the first pump outlet.

In certain exemplary embodiments the supplemental pump feature is a jet eductor, and the first pump includes an impeller, wherein the impeller mixes the inlet fuel flow with the inlet stripping gas flow to form the fuel/gas mixture flow.

In certain exemplary embodiments the second pump includes a radial impeller that separates the fuel/gas mixture flow into the outlet stripping gas flow and the outlet fuel flow and generates the second pressure rise.

In certain exemplary embodiments the aeronautical engine is a helicopter engine.

In an exemplary aspect of the present disclosure, a method is provided for reducing an oxygen content of a fuel flow to an aeronautical engine. The method includes providing a first pump with an inlet fuel flow through an inlet fuel line; providing the first pump with a stripping gas flow through a stripping gas line; mixing the inlet fuel flow with the stripping gas flow to generate a fuel/gas mixture flow through an outlet of the first pump, the fuel/gas mixture flow through the outlet of the first pump defining a higher pressure than the inlet fuel flow through the inlet fuel line; and separating the fuel/gas mixture flow from the outlet of the first pump into an outlet fuel flow and an outlet stripping gas flow, wherein providing the first pump with the inlet fuel flow through the inlet fuel line comprises drawing the inlet fuel flow through the inlet fuel line and into the first pump with the first pump.

In certain exemplary aspects drawing the inlet fuel flow through the inlet fuel line and into the first pump with the first pump includes drawing the inlet fuel flow through the inlet fuel line and into the first pump with the first from a sub-ambient pressure fuel supply.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A pump mixer separator unit of the present disclosure includes an integral first pump and second pump. In this manner, the integral first pump of the pump mixer separator unit (A) draws an inlet fuel flow, from a sub-ambient pressure fuel supply, within a first pump fuel inlet; (B) mixes the inlet fuel flow with an inlet stripping gas flow to form a fuel/gas mixture flow and thereby is capable of reducing a free oxygen content of the inlet fuel flow; and (C) generates a first pressure rise from the inlet fuel flow to the fuel/gas mixture flow. Additionally, the integral second pump of the pump mixer separator unit (D) separates the fuel/gas mixture flow into an outlet stripping gas flow and an outlet fuel flow; and (E) generates a second pressure rise from the fuel/gas mixture flow to the outlet fuel flow. The first pump may include a supplemental pump feature for drawing in the inlet fuel flow (such as, e.g., a jet eductor). Advantageously, a pump mixer separator unit of the present disclosure may allow all of these benefits to support engine operations to be achieved in a single component or unit. This combined functionality in a single component, i.e., a pump mixer separator unit of the present disclosure, may minimize the cost and weight of needing multiple separate devices to each achieve a singular function.

A pump mixer separator unit of the present disclosure may also enable certain design capabilities for aircraft utilizing a sub-ambient pressure fuel supply, such as in certain helicopter applications. For example, in helicopter applications, a fuel line from a helicopter to the engine provides a fuel flow at sub-ambient pressures to prevent potential risks associated with a low flying helicopter. The pump mixer separator unit of the present disclosure provides the capability to draw fuel up from a sub-ambient pressure fuel supply.

Figure 1:
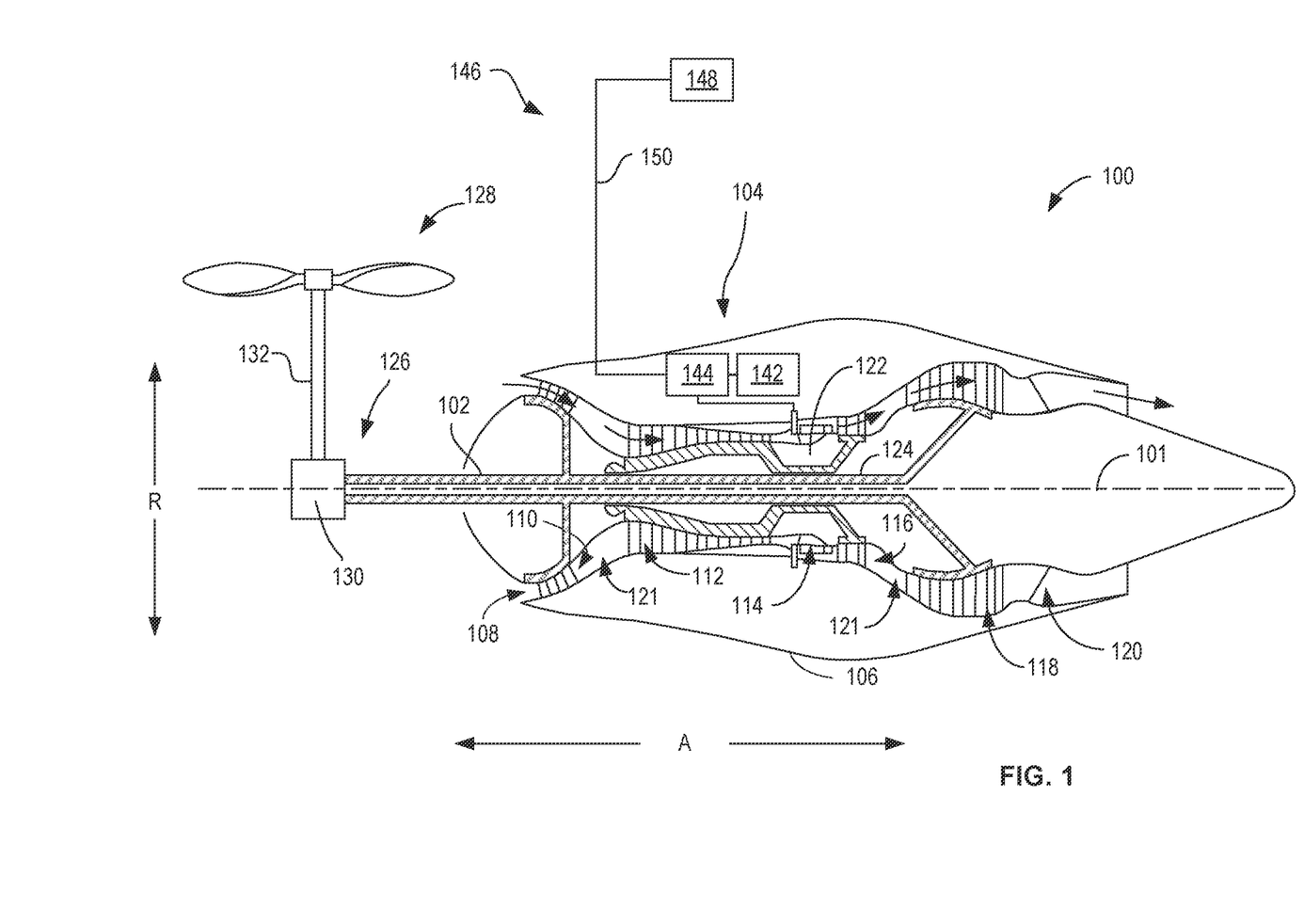
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a turboshaft engine 100. As shown in FIG. 1, the turboshaft engine 100 defines an axial direction A (extending parallel to a longitudinal centerline or axis 101 provided for reference), a radial direction R, and a circumferential direction (extending about the axial direction A; not depicted in FIG. 1). In general, the turboshaft 100 includes a turbomachine 104 and an output shaft 102 coupled to the turbomachine 104.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turboshaft engine further includes one or more drive shafts. More specifically, the turboshaft engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the output shaft 102 of the turboshaft engine 100 is coupled to a load. The load, for the embodiment depicted, includes a gear train 126 and a propeller 128. For example, the gear train 126 includes a gearbox 130 and a drive shaft 132. The gearbox 130 receives the rotational power from the output shaft 102 and redirects it to the drive shaft 132. The drive shaft 132, in turn, rotates the propeller 128. Such a configuration may be incorporated into a helicopter, or any other suitable aircraft utilizing a propeller. Notably, although the load is depicted as a gear train 126 and propeller 128 for the embodiment shown, in other embodiments, the load may be, e.g., an electric machine (such as an electric generator), or any other suitable load.

Referring still to FIG. 1, the turboshaft engine 100 additionally includes an accessory gearbox 142, a fuel oxygen reduction unit 144, and a fuel delivery system 146. For the embodiment shown, the accessory gearbox 142 is located within the outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 is coupled to, or otherwise rotatable with, the accessory gearbox 142. In such a manner, it will be appreciated that the exemplary fuel oxygen reduction unit 144 is driven by the accessory gearbox 142.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turboshaft engine 100. A more detailed schematic of a fuel delivery system in accordance with an exemplary embodiment of the present disclosure is provided below with reference to FIG. 4.

It will be appreciated, however, that the exemplary turboshaft engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turbofan engine, turboprop engine, turbojet engine, any other suitable turboshaft engine, etc. In such a manner, it will further be appreciated that in other embodiments the gas turbine engine may have any other suitable configuration, such as any other suitable number or arrangement of shafts, compressors, turbines, fans, etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of combustion engine, such as reciprocating engines.

Moreover, it will be appreciated that although for the embodiment depicted, the turbofan engine 100 includes the fuel oxygen reduction unit 144 positioned within the turbomachine 104, i.e., within the casing 106 of the turbomachine 104, in other embodiments, the fuel oxygen reduction unit 144 may be positioned at any other suitable location. For example, in other embodiments, the fuel oxygen reduction unit 144 may instead be positioned remote from the turbofan engine 100. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc.

Figure 2:
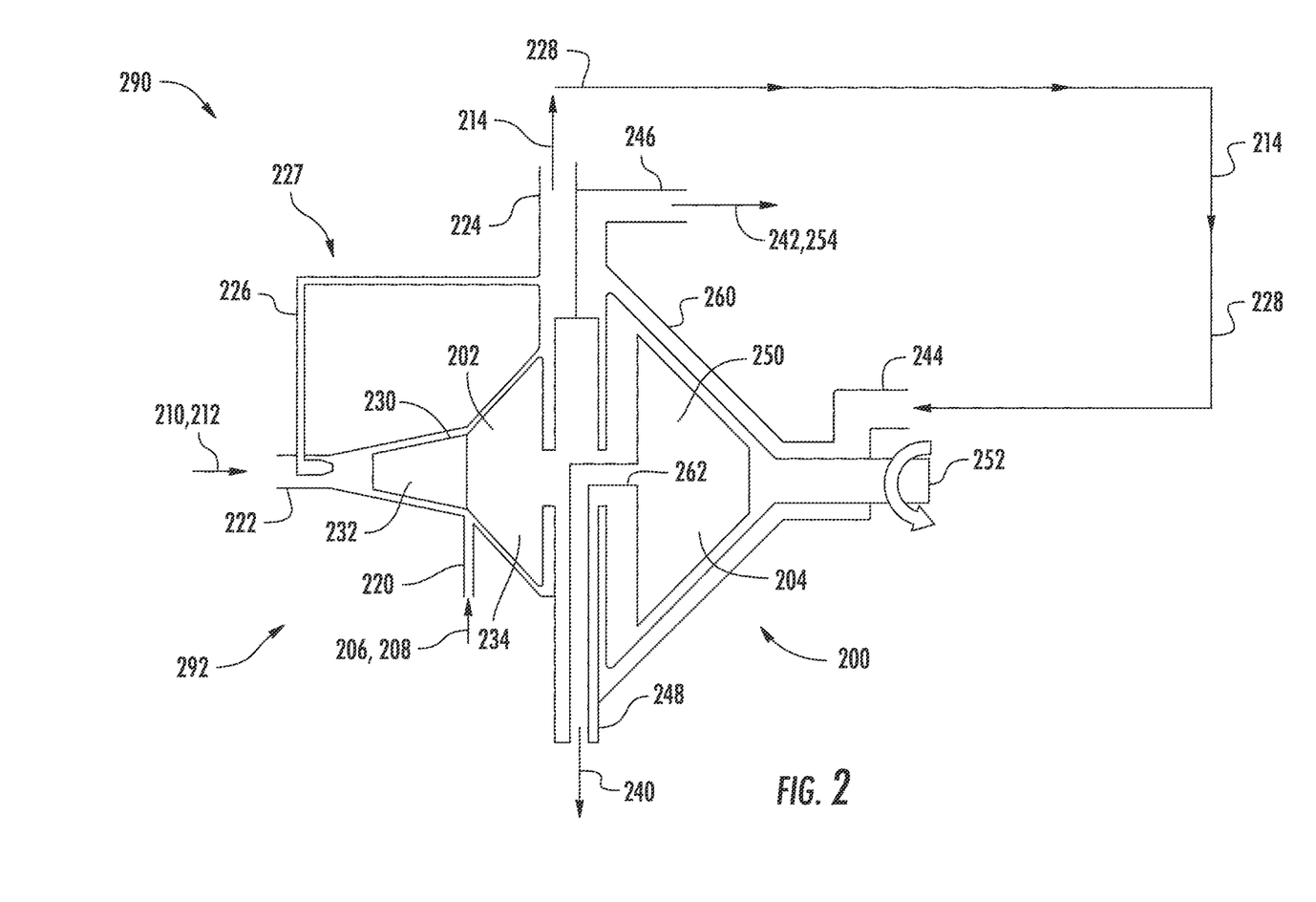
FIG. 2 is a schematic view of a pump mixer separator unit in accordance with an exemplary embodiment of the present disclosure.

Referring now to FIG. 2, a schematic drawing of a pump mixer separator unit 200 for an aeronautical engine, e.g., a gas turbine engine, in accordance with an exemplary aspect of the present disclosure is provided. In at least certain exemplary embodiments, the exemplary pump mixer separator unit 200 depicted in FIG. 2 may be incorporated into, e.g., the exemplary engine 100 described above with reference to FIG. 1 (e.g., may be incorporated into the fuel oxygen reduction unit 144 depicted in FIG. 1 and described above).

FIG. 2 illustrates an exemplary embodiment of the present disclosure. Referring to FIG. 2, a pump mixer separator unit 200 for an aeronautical engine includes a first pump 202 and a second pump 204. The first pump 202 and the second pump 204 are integral to the pump mixer separator unit 200. As used herein, the term "integral" with respect to the first pump 202 and second pump 204 refer to the first and second pumps 202, 204 each being contained within a single housing or outer casing of the pump mixer separator unit 200. In other words, each of the first pump 202 and the second pump 204 are contained within a single pump mixer separator unit 200 and each of the first pump 202 and the second pump 204 are located at a position fixed relative to the outer casing of the pump mixer separator unit 200. In this manner, the pump mixer separator unit 200, having an integral first pump 202 and second pump 204 therein, is distinguishable from two separate components, i.e., a first component having a first housing containing a first pump therein and a separate second component having a separate second housing containing a second pump therein.

Figure 3:
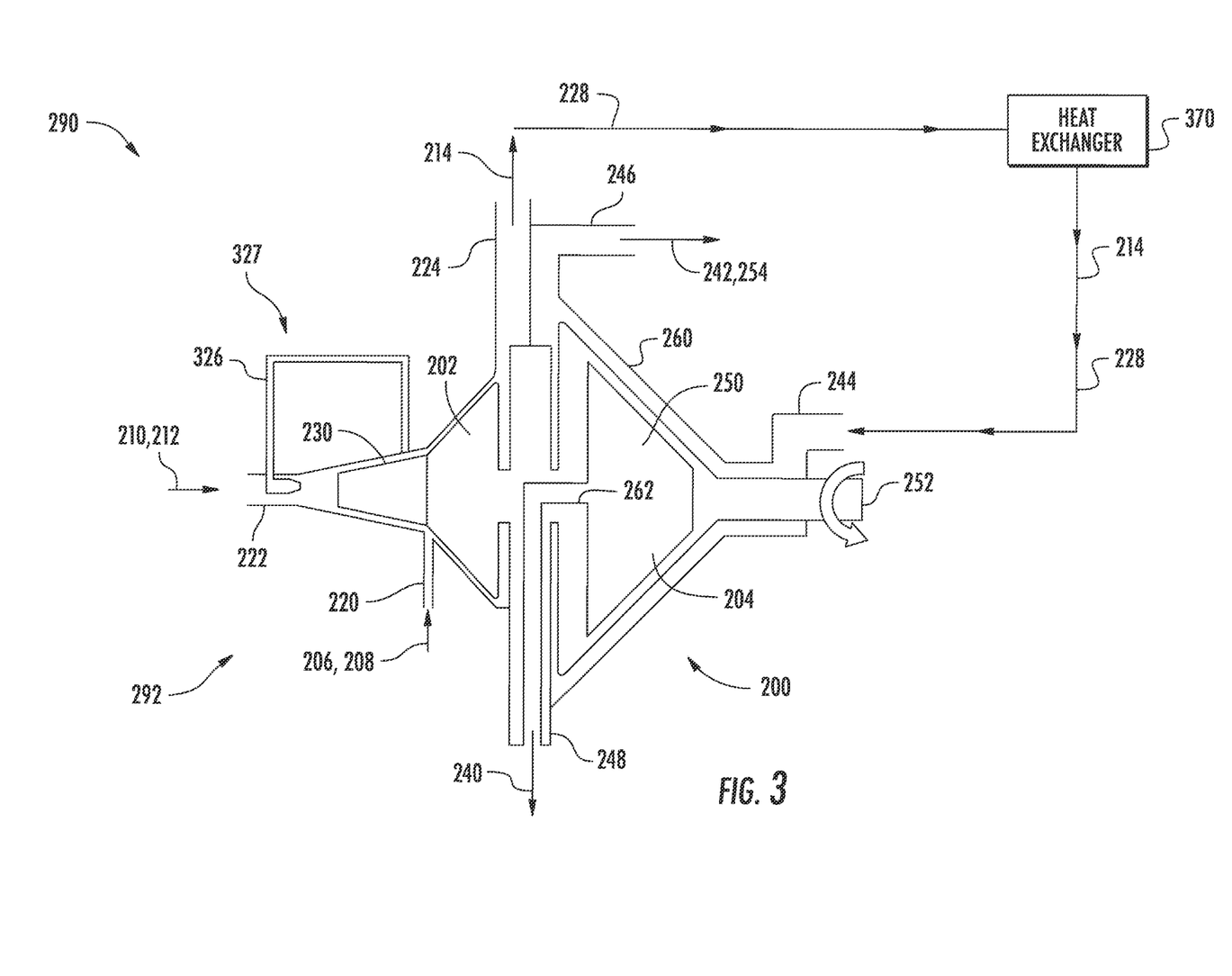
FIG. 3 is a schematic view of a pump mixer separator unit in accordance with another exemplary embodiment of the present disclosure.
Figure 4:
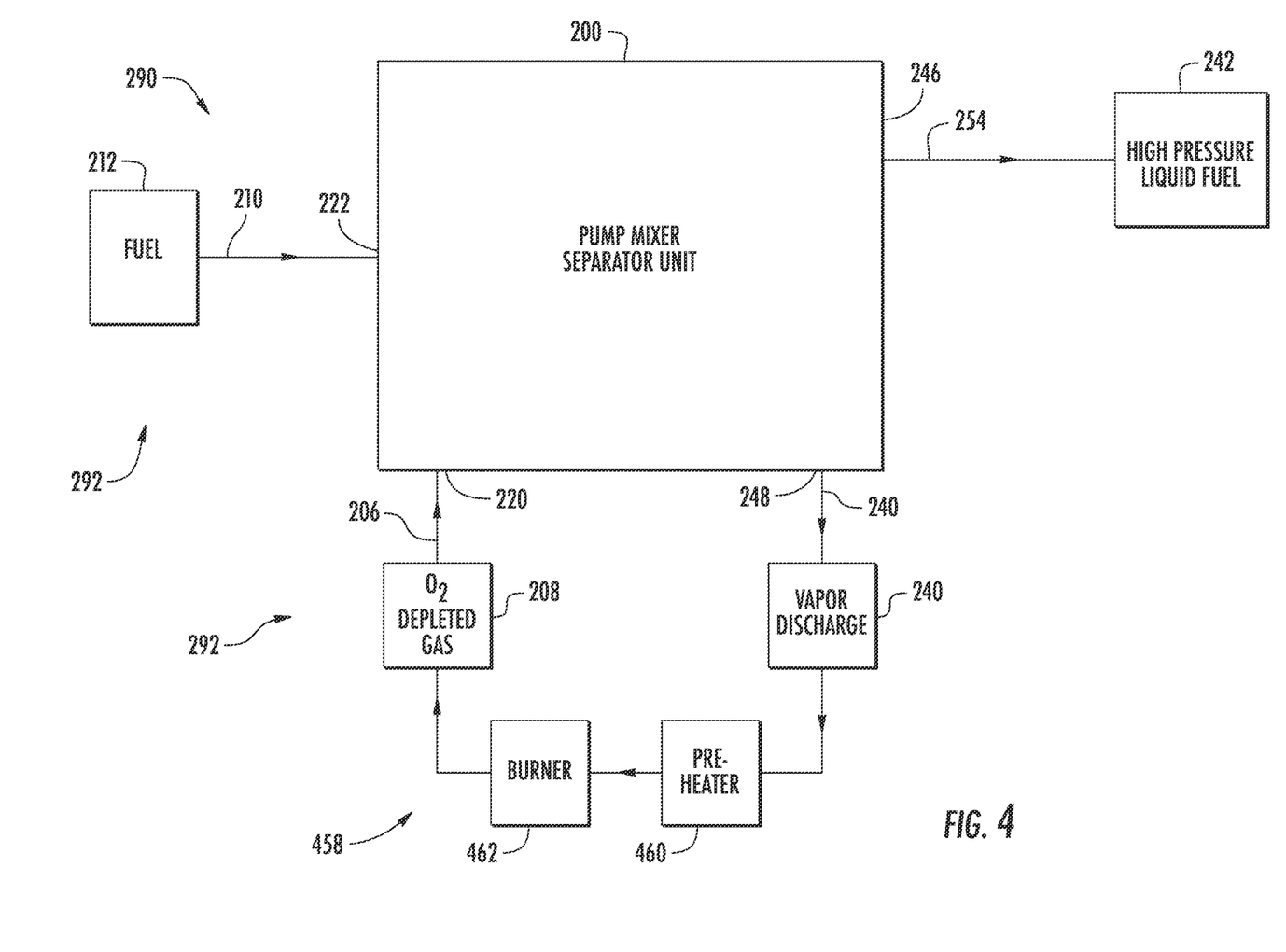
FIG. 4 is a schematic view of a fuel delivery system incorporating a pump mixer separator unit in accordance with an exemplary embodiment of the present disclosure.

The pump mixer separator unit 200 is in communication with a stripping gas line 206 that provides an inlet stripping gas flow 208 and a fuel line 210 that provides an inlet fuel flow 212 as will be described in more detail below. Referring to FIGS. 2-4, a fuel delivery system 290 of the present disclosure includes a supply portion 292 having the stripping gas line 206 and the fuel line 210 and a pump mixer separator unit 200 as described herein. As will be appreciated from the description herein, the pump mixer separator unit 200 may part of a fuel oxygen reduction unit for reducing an oxygen content of a fuel flow through the fuel delivery system.

It will be appreciated that the term "stripping gas" is used herein as a term of convenience to refer to a gas generally capable of performing the functions described herein. The stripping gas flow 208 flowing through the stripping gas line 206 to the pump mixer separator unit 200 may be an actual stripping gas functioning to strip oxygen from the fuel flow 212 that is drawn into pump mixer separator unit 200. Alternatively, the stripping gas flow 208 may be a sparging gas bubbled through a liquid fuel to reduce an oxygen content of such fuel. For example, the stripping gas flow 208 may be an inert gas, such as Nitrogen or Carbon Dioxide ($CO_2$), a gas mixture made up of at least 50% by mass inert gas, or some other gas or gas mixture having a relatively low oxygen content.

Referring to FIG. 2, the first pump 202 is in fluid communication with the stripping gas line 206 and the fuel line 210. The first pump 202 draws in the inlet fuel flow 212 and mixes the inlet fuel flow 212 with the inlet stripping gas flow 208 to form a fuel/gas mixture flow 214 and generates a first pressure rise from the inlet fuel flow 212 to the fuel/gas mixture flow 214 as will be described in more detail below.

Referring to FIG. 2, in an exemplary embodiment, the first pump 202 includes a first pump gas inlet 220, a first pump fuel inlet 222, a first pump outlet 224, and a supplemental pump feature for inducing a fuel flow through the first pump fuel inlet 222. Referring to FIGS. 2 and 4, the first pump gas inlet 220 is in fluid communication with the stripping gas line 206 and the first pump fuel inlet 222 is in fluid communication with the fuel line 210. Moreover, for the embodiment of FIGS. 2 and 3, the supplemental pump feature is a jet eductor 226. Notably, however, in other embodiments, the supplemental pump feature for inducing a fuel flow through the first pump fuel inlet 222 may be any other suitable device, such as a stand-alone pump.

It will also be appreciated that the exemplary pump mixer separator unit 200 depicted is operable with a fuel delivery system 146, such as a fuel delivery system 146 of the gas turbine engine including the pump mixer separator unit 200 (see, e.g., FIG. 1). The exemplary fuel delivery system 146 generally includes a plurality of fuel lines, and in particular, an inlet fuel line 210 and an outlet fuel line 254. The inlet fuel line 210 is fluidly connected to the first pump fuel inlet 222 and the outlet fuel line 254 is fluidly connected to a second pump fuel outlet 246 of the pump mixer separator unit 200 for receiving a flow of deoxygenated liquid fuel or outlet fuel flow 242. In certain exemplary embodiments, the fuel and gas flow paths of the present disclosure may be formed of any combination of one or more conduits, tubes, pipes, etc.

Referring still to the embodiment of FIG. 2, the jet eductor 226 extends from a location downstream of the first pump 202 to a location upstream of the first pump 202. For example, in one exemplary embodiment, the jet eductor 226 extends from a portion of a fuel/gas mixture line 228 fluidly coupled to the first pump outlet 224 to a portion of the fuel line 210 at a location upstream of the first pump 202 or the first pump fuel inlet 222. Notably, however, in other embodiments, the jet eductor 226 may instead be in fluid communication with, and extend from, and other suitable pressurized fluid source, such as the outlet fuel line 254.

The jet eductor 226 forms a jet eductor supply loop 227 that recirculates a portion of the inlet fuel flow 212 downstream of a portion of the first pump 202 back to the fuel line 210 at a location upstream of the first pump 202. In this manner, the portion of the fuel flow 212 that is recirculated through the jet eductor supply loop 227 enters the fuel line 210 at a portion of the first pump fuel inlet 222 to induce additional fuel flow, from a fuel line 210 that provides an inlet fuel flow 212 at, e.g., a sub-ambient pressure, into the first pump 202. In other words, the jet eductor 226 and the jet eductor supply loop 227 help draw a vacuum at the first pump fuel inlet 222 to allow a pump mixer separator unit 200 of the present disclosure to draw in the inlet fuel flow 212 at, e.g., a sub-ambient pressure.

Referring to FIG. 3, in another exemplary embodiment, a jet eductor 326 forms a jet eductor supply loop 327 that recirculates a pure liquid supply flow, i.e., a pure fuel flow 212 back to the fuel line 210 at a location upstream of the first pump 202. More specifically, for the embodiment of FIG. 3, the jet eductor 326 extends from a location upstream of the inlet stripping gas flow 208, prior to the fuel flow having mixed with the stripping gas flow within the first pump 202.

Referring back to FIG. 2, in an exemplary embodiment, the first pump 202 includes the jet eductor 226 and an impeller 230 that mixes the inlet fuel flow 212 with the inlet stripping gas flow 208 to form the fuel/gas mixture flow 214. In one embodiment, the impeller 230 of the first pump 202 includes an axial impeller or inducer 232 and a radial impeller 234. For example, in one embodiment, the jet eductor 226 feeds the axial impeller 232 which feeds the radial impeller 234. The axial impeller 232 may be configured to provide a flow generally along an axial direction of the first pump 202, whereas the radial impeller 234 may be configured to provide a flow generally along a radial direction of the first pump 202.

Referring to FIG. 2, the second pump 204 is in fluid communication with the first pump 202. The second pump 204 receives the fuel/gas mixture flow 214 from the first pump 202 and separates the fuel/gas mixture flow 214 into an outlet stripping gas flow 240 and an outlet fuel flow 242 and generates a second pressure rise from the fuel/gas mixture flow 214 to the outlet fuel flow 242.

Referring to FIG. 2, in an exemplary embodiment, the second pump 204 includes a second pump inlet 244, a second pump fuel outlet 246, and a second pump gas outlet 248. Referring to FIGS. 2 and 4, the second pump inlet 244 is in fluid communication with the first pump outlet 224. In this configuration, the outlet fuel flow 242 exits the pump mixer separator unit 200 at the second pump fuel outlet 246 and the outlet stripping gas flow 240 exits the pump mixer separator unit 200 at the second pump gas outlet 248. Furthermore, the second pump inlet 244 receives the fuel/gas mixture flow 214 from the first pump outlet 224.

Referring still to FIG. 2, in an exemplary embodiment, the second pump 204 includes an impeller 250 that separates the fuel/gas mixture flow 214 into the outlet stripping gas flow 240 and the outlet fuel flow 242 and generates the second pressure rise. In one embodiment, the impeller 250 of the second pump 204 includes a radial impeller. For example, the second pump 204 may rotate at a relatively high rotational speed, such that the relatively heavy liquid fuel component of the fuel/gas mixture flow 214 is centrifuged outward along the radial direction through the second pump fuel outlet 246, while the relatively light stripping gas component of the fuel/gas mixture flow 214 flows along an axial direction to and through the second pump gas outlet 240.

A pump mixer separator unit 200 of the present disclosure includes an integral first pump 202 and second pump 204. In this manner, the integral first pump 202 of the pump mixer separator unit 200 (A) draws an inlet fuel flow 212, from a sub-ambient pressure fuel supply, within a first pump fuel inlet 222; (B) mixes the inlet fuel flow 212 with an inlet stripping gas flow 208 to form a fuel/gas mixture flow 214 and thereby is capable of reducing a free oxygen content of the inlet fuel flow 212; and (C) generates a first pressure rise from the inlet fuel flow 212 to the fuel/gas mixture flow 214. Additionally, the integral second pump 204 of the pump mixer separator unit 200 (D) separates the fuel/gas mixture flow 214 into an outlet stripping gas flow 240 and an outlet fuel flow 242; and (E) generates a second pressure rise from the fuel/gas mixture flow 214 to the outlet fuel flow 242. Advantageously, a pump mixer separator unit 200 of the present disclosure allows all of these benefits to support engine operations to be achieved in a single component or unit. This combined functionality in a single component, i.e., a pump mixer separator unit 200 of the present disclosure, minimizes the cost and weight of needing multiple separate devices to each achieve a singular function.

A pump mixer separator unit 200 of the present disclosure may enable certain design capabilities for helicopter applications. For example, in helicopter applications, a fuel line from a helicopter to the engine provides a fuel flow at sub-ambient pressures to prevent potential risks associated with flying a helicopter. The pump mixer separator unit 200 of the present disclosure provides the capability to draw fuel up from a sub-ambient pressure fuel supply using, e.g., the supplemental pump feature of the first pump 202.

Referring to FIG. 2, as described above, in an exemplary embodiment of the present disclosure, the impeller 230 of the first pump 202 includes an axial impeller 232 and a radial impeller 234, and the impeller 250 of the second pump 204 is a radial impeller 250, as described above. In an exemplary embodiment, the jet eductor 226 feeds the axial impeller 232 which feeds the radial impeller 234 of the first pump 202 which is in communication with the radial impeller 250 of the second pump 204. The jet eductor 226 creates a suction that helps draw fuel, e.g., inlet fuel flow 212, into the pump mixer separator unit 200. The axial impeller 232 also helps suck fuel into the first pump 202 of the pump mixer separator unit 200 and generates a small pressure rise. The oxygen free gas, e.g., inlet stripping gas flow 208, is then injected into a discharge portion of the axial impeller 232 at an inlet portion of the radial impeller 234, where an inlet fuel flow 212 is mixed with an inlet stripping gas flow 208 to form a fuel/gas mixture flow 214, and an additional pressure rise is generated to push the fuel/gas mixture 214 through downstream pump mixer separator unit 200 features, like a heat exchanger. The fuel/gas mixture 214 is then delivered to an inlet portion of the final pumping radial impeller 250 of the second pump 204, where the gas and fuel are separated, and an additional pressure rise is generated. Next, an outlet stripping gas flow 240 exits the pump mixer separator unit 200 at the second pump gas outlet 248, and the outlet fuel flow 242 exits through the second pump fuel outlet 246 of the pump mixer separator unit 200 and is then routed to the rest of the turbine engine fuel system for combustion and as a hydraulic source of supply for actuation systems.

Referring to FIG. 2, in an exemplary embodiment, the first pump 202 and the second pump 204 are driven by a single rotational input shaft 252. For example, in certain embodiments, the first pump 202 and the second pump 204 may be coupled to an accessory gearbox 142 (see FIG. 1), a suitable power source, etc. In some embodiments, the first pump 202 and the second pump 204 are driven by a mechanical source. In other embodiments, the first pump 202 and the second pump 204 are driven by an electrical source. In some embodiments, a power source is selected based on readings detected by engine sensors.

Advantageously, a pump mixer separator unit 200 of the present disclosure provides for an outlet fuel flow 242 having a lower oxygen content than the inlet fuel flow 212; the outlet fuel flow 242 having a higher pressure than the inlet fuel flow 212; and the outlet stripping gas flow 240 having a higher oxygen content than the inlet stripping gas flow 208, as described in more detail below.

Referring to FIG. 4, in one embodiment, an exemplary pump mixer separator unit 200 of the present disclosure recirculates and reuses the stripping gas flow 240, e.g., the stripping gas flow 208, 240 operates in a substantially closed loop via a recirculation stripping gas flow loop 458. However, the outlet stripping gas flow 240 that exits the pump mixer separator unit 200 at the second pump gas outlet 248, having interacted with the inlet fuel flow 212 to form the fuel/gas mixture flow 214, has a relatively high oxygen content. Accordingly, in order to reuse the stripping gas 240, an oxygen content of the stripping gas 240 from the second pump gas outlet 248 of the pump mixer separator unit 200 needs to be reduced. Referring to FIG. 4, in an exemplary embodiment, the stripping gas 240 flows through a preheater 460 and through a stripping gas oxygen reduction unit where the oxygen content of the stripping gas 240 is reduced. More specifically, for the embodiment shown, the stripping gas oxygen reduction unit is a burner 462. Within the burner 462 the relatively oxygen-rich stripping gas 240 is reacted, or rather combusted, to reduce the oxygen content thereof. It will be appreciated that burner 462 may instead be configured in any suitable manner to perform such functions. For example, in certain embodiments, the burner 462 may additionally, or alternatively, include geometries of catalytic components through which the relatively oxygen-rich stripping gas 240 flows to reduce an oxygen content thereof. In one or more of these configurations, a byproduct may be produced, such as water, which may be ducted away from the burner 462 (duct not depicted in the embodiment of FIG. 4). In one or more of these embodiments, the burner 462 may be configured to reduce an oxygen content of the stripping gas 240 to less than about five percent (5%) oxygen (O2) by mass, such less than about two (2) percent (3%) oxygen (O2) by mass, such less than about one percent (1%) oxygen (O2) by mass.

The resulting relatively low oxygen content gas is then provided through the remainder of the recirculation stripping gas flow loop 458 and back to the stripping gas line 206, such that the cycle may be repeated. In such a manner, it will be appreciated that the stripping gas 208, 240 may be any suitable gas capable of undergoing the chemical transitions described above. For example, the stripping gas may be air from, e.g., a core air flow path of a gas turbine engine including the pump mixer separator unit 200 (e.g., compressed air bled from an HP compressor 112; see FIG. 1). However, in other embodiments, the stripping gas may instead be any other suitable gas, such as an inert gas, such as Nitrogen or Carbon Dioxide (CO2), a gas mixture made up of at least 50% by mass inert gas, or some other gas or gas mixture having a relatively low oxygen content.

Referring back to FIG. 3, in one exemplary embodiment, the pump mixer separator unit 200 also includes a heat exchanger 370 located between the first pump outlet 224 and the second pump inlet 244. More specifically, for the embodiment shown, the heat exchanger 370 is in thermal communication with a flowpath extending from the first pump outlet 224 to the second pump inlet 244, and more specifically, still, is in thermal communication with the fuel/gas mixture line 228. The heat exchanger 370 may thermally couple a portion of the fuel/gas mixture line 228 to a respective engine system. The engine system may be any suitable engine system, such as one or more of a main lubrication oil system, a variable frequency generator system, a thermal transport system, etc. capable of accepting heat from the fuel/gas mixture line 228. Alternatively, the heat exchanger 370 may thermally couple a portion of the fuel/gas mixture line 228 to any other suitable heat sink, such as an ambient heat exchanger.

Referring to FIGS. 1-4, the use of pump mixer separator unit 200 for a typical operation will now be described.

During typical operations, a flow of inlet fuel 212 flows through a fuel line 210 and is provided to the first pump 202 at the first pump fuel inlet 222. In an exemplary embodiment, the fuel line 210 provides the inlet fuel flow 212 at a sub-ambient pressure. In this manner, a pump mixer separator unit 200 of the present disclosure may enable certain design capabilities for helicopter applications. For example, in certain helicopter applications, a fuel line from a helicopter to the engine provides a fuel flow at sub-ambient pressures to prevent potential risks associated with a low flying helicopter. The pump mixer separator unit 200 of the present disclosure provides the capability to draw fuel up from a sub-ambient pressure fuel supply.

Next, a flow of stripping gas, e.g., an inlet stripping gas 208, flows through the stripping gas line 206 to the first pump 202 via first pump gas inlet 220. The first pump 202 draws in the inlet fuel flow 212 and mixes the inlet fuel flow 212 with the inlet stripping gas 208 to form a fuel/gas mixture flow 214 and generates a first pressure rise from the inlet fuel flow 212 to the fuel/gas mixture flow 214. The fuel/gas mixture flow 214 generated within the first pump 202 of the pump mixer separator unit 200 is provided to the second pump inlet 244 of the second pump 204.

Generally, it will be appreciated that during operation of the pump mixer separator unit 200, the inlet fuel flow 212 provided through the inlet fuel line 210 to the first pump fuel inlet 222 may have a relatively high oxygen content. The stripping gas flow 208 provided to the first pump gas inlet 220 may have a relatively low oxygen content or other specific chemical structure. Within the first pump 202, the inlet fuel flow 212 is mixed with the stripping gas 208, resulting in the fuel/gas mixture flow 214. As a result of such mixing a physical exchange may occur whereby at least a portion of the oxygen within the inlet fuel flow 212 is transferred to the stripping gas 208, such that the fuel component of the mixture 214 has a relatively low oxygen content, e.g., as compared to the inlet fuel flow 212 provided through the inlet fuel line 210, and the stripping gas component of the mixture 214 has a relatively high oxygen content, e.g., as compared to the inlet stripping gas 208 provided through the stripping gas line 206.

Within the second pump 204 the relatively high oxygen content stripping gas of the fuel/gas mixture flow 214 is then separated from the relatively low oxygen content fuel of the fuel/gas mixture flow 214 back into the respective flows of an outlet stripping gas flow 240 and an outlet fuel flow 242.

The second pump 204 also generates a second pressure rise from the fuel/gas mixture flow 214 to the outlet fuel flow 242.

During operation of the second pump 204, rotation of the second pump 204 about a central axis may generally force the heavier outlet fuel flow 242 outward along a radial direction R through a second pump outer channel 260 and the lighter outlet stripping gas flow 240 inward along the radial direction R through the second pump inner channel 262. In such a manner, the outlet fuel flow 242 may exit through the second pump fuel outlet 246 of the pump mixer separator unit 200 and the outlet stripping gas flow 240 may exit through the second pump gas outlet 248 of the pump mixer separator unit 200, as is indicated.

Further, it will be appreciated that with such a configuration, the outlet fuel flow 242 exiting the pump mixer separator unit 200 through the second pump fuel outlet 246 may be at a higher pressure than the inlet fuel flow 212 provided through the inlet fuel line 210, and further higher than the fuel/gas mixture flow 214 provided to the second pump inlet 244. Such may be due at least in part to the centrifugal force exerted on such outlet fuel flow 242 and the rotation of the components of the second pump 204.

For example, it will be appreciated that with such an exemplary embodiment, the first pump 202 and the second pump 204 of the pump mixer separator unit 200 may generate a first pressure rise and a second pressure rise, respectively, in the fuel flow during operation. As used herein, the term "pressure rise" refers to a net pressure differential between a pressure of the flow of outlet fuel 242 provided to the second pump fuel outlet 246 of the pump mixer separator unit 200, i.e., a "liquid fuel outlet pressure", and a pressure of the inlet fuel flow 212 provided through the inlet fuel line 210 to the first pump 202. In at least certain exemplary embodiments, the pressure rise of the outlet fuel flow 242 may be at least about sixty (60) pounds per square inch ("psi"), such as at least about ninety (90) psi, such as at least about one hundred (100) psi, such as up to about seven hundred and fifty (750) psi. With such a configuration, it will be appreciated that in at least certain exemplary embodiments of the present disclosure, the liquid fuel outlet pressure may be at least about seventy (70) psi during operation. For example, in at least certain exemplary embodiments, the liquid fuel outlet pressure may be at least about one hundred (100) psi during operation, such as at least about one hundred and twenty-five (125) psi during operation, such as up to about eight hundred (800) psi during operation.

Further, it will be appreciated that the outlet fuel flow 242 provided to the second pump fuel outlet 246, having interacted with the stripping gas 208, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the outlet fuel flow 242 provided to the second pump fuel outlet 246 may an oxygen content of less than about five (5) parts per million ("ppm"), such as less than about three (3) ppm, such as less than about two (2) ppm, such as less than about one (1) ppm, such as less than about 0.5 ppm.

It will be appreciated, however, that the exemplary pump mixer separator unit 200 described above is provided by way of example only. In other embodiments, the pump mixer separator unit 200 may be configured in any other suitable manner.

Figure 5:
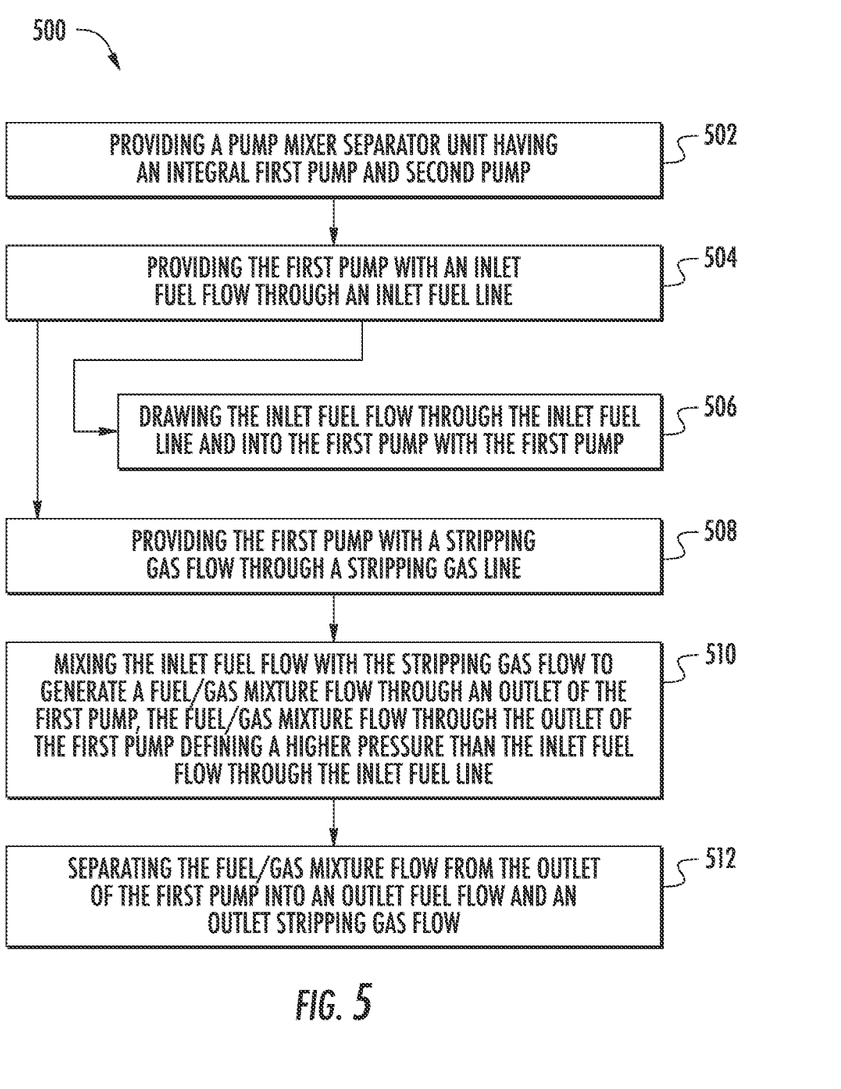
FIG. 5 is a flow diagram of a method of reducing an oxygen content of a fuel flow to an aeronautical engine in accordance with an exemplary aspect of the present disclosure.

Referring now to FIG. 5, a method 500 of reducing an oxygen content of a fuel flow to an aeronautical engine in accordance with an exemplary aspect of the present disclosure is depicted. The exemplary method 500 may be utilized to operate one or more of the exemplary pump mixer separator units described above with reference to FIGS. 1 through 4.

For the exemplary aspect of FIG. 5, the method 400 generally includes at (502) providing a pump mixer separator unit having an integral first pump and second pump as described in detail above with reference to FIGS. 1 through 4.

The method 500 further includes at (504) providing the first pump with an inlet fuel flow through an inlet fuel line. For the exemplary aspect depicted, providing the first pump with the inlet fuel flow through the inlet fuel line includes at (506) drawing the inlet fuel flow through the inlet fuel line and into the first pump with the first pump.

For the exemplary aspect depicted, the method 500 further includes at (508) providing the first pump with a stripping gas flow through a stripping gas line. The method 500 further includes at (510) mixing the inlet fuel flow with the stripping gas flow to generate a fuel/gas mixture flow through an outlet of the first pump, the fuel/gas mixture flow through the outlet of the first pump defining a higher pressure than the inlet fuel flow through the inlet fuel line. For the exemplary aspect depicted, the method 500 further includes at (512) separating the fuel/gas mixture flow from the outlet of the first pump into an outlet fuel flow and an outlet stripping gas flow.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A pump mixer separator unit for an aeronautical engine, the pump mixer separator unit in communication with a stripping gas line that provides an inlet stripping gas flow and a fuel line that provides an inlet fuel flow, the pump mixer separator unit comprising:
 a housing;
 a first inlet in the housing connected to the stripping gas line;
 a second inlet in the housing connected to the fuel line;
 a first outlet in the housing to provide an outlet fuel flow; and
 a second outlet in the housing to provide an outlet stripping gas flow,
 the housing containing a first pump and a second pump integral with the housing:

the first pump in fluid communication with the stripping gas line and the fuel line to form a fuel/gas mixture flow, the first pump to draw in fuel at a sub-ambient pressure and generate a first pressure rise from the inlet fuel flow to the fuel/gas mixture flow;

the second pump in fluid communication with the first pump, wherein the second pump receives the fuel/gas mixture flow from the first pump, wherein the second pump separates the fuel/gas mixture flow into the outlet stripping gas flow and the outlet fuel flow and generates a second pressure rise from the fuel/gas mixture flow to the outlet fuel flow, and a recirculation stripping gas flow loop in fluid communication with the second pump and the stripping gas line, the recirculation stripping gas flow loop configured to:

receive the outlet stripping gas flow from the second pump, reduce an oxygen content of the received outlet stripping gas flow, and provide the received the outlet stripping gas flow having the reduced oxygen content to the stripping gas line, wherein the first pump includes a supplemental pump feature for drawing the inlet fuel flow through the fuel line through suction at the sub-ambient pressure during operation, the first pump further including an axial impeller and a first radial impeller, the second pump including a second radial impeller, the axial impeller to draw the inlet fuel flow in conjunction with the supplemental pump feature via the fuel line and generate the first pressure rise, an output of the axial impeller connected to an input of the first radial impeller, the axial impeller to provide the inlet fuel flow to the first radial impeller, the first radial impeller to mix the inlet fuel flow with the inlet stripping gas flow from the stripping gas line to form the fuel/gas mixture flow, the first radial impeller to output the fuel/gas mixture flow to the second radial impeller, the second radial impeller separating the fuel/gas mixture flow into the outlet stripping gas flow and the outlet fuel flow and generating the second pressure rise.

2. The pump mixer separator unit of claim 1, wherein the first pump includes a first pump gas inlet, a first pump fuel inlet, and a first pump outlet,
wherein the first pump gas inlet is in fluid communication with the stripping gas line, and
wherein the first pump fuel inlet is in fluid communication with the fuel line.

3. The pump mixer separator unit of claim 2, wherein the second pump includes a second pump inlet, a second pump fuel outlet, and a second pump gas outlet,
wherein the second pump inlet is in fluid communication with the first pump outlet,
wherein the outlet fuel flow exits the pump mixer separator unit at the second pump fuel outlet,
wherein the outlet stripping gas flow exits the pump mixer separator unit at the second pump gas outlet, and
wherein the second pump inlet receives the fuel/gas mixture flow from the first pump outlet.

4. The pump mixer separator unit of claim 3, further comprising a heat exchanger located between the first pump outlet and the second pump inlet.

5. The pump mixer separator unit of claim 1, wherein the supplemental pump feature is a jet eductor, and wherein the jet eductor extends from a fuel/gas mixture line fluidly coupled to a first pump outlet to the fuel line at a location upstream of a first pump fuel inlet.

6. The pump mixer separator unit of claim 1, wherein the outlet fuel flow has a lower oxygen content than the inlet fuel flow, wherein the outlet fuel flow has a higher pressure than the inlet fuel flow, and wherein the outlet stripping gas flow has a higher oxygen content than the inlet stripping gas flow.

7. The pump mixer separator unit of claim 1, wherein the first pump and the second pump are driven by a mechanical source.

8. The pump mixer separator unit of claim 1, wherein the first pump and the second pump are driven by an electrical source.

9. The pump mixer separator unit of claim 1, wherein the first pump draws in the inlet fuel flow from a sub-ambient pressure fuel supply, and wherein the pump mixer separator unit is for a helicopter engine.

10. The pump mixer separator unit of claim 1, wherein the supplemental pump feature is a jet eductor comprising a jet eductor supply loop that recirculates a portion of the inlet fuel flow downstream of a portion of the first pump back to the fuel line at a location upstream of the first pump.

11. The pump mixer separator unit of claim 1, wherein the recirculation stripping gas flow loop is to transfer heat from the fuel/gas mixture flow.

12. A fuel delivery system for an aeronautical engine, comprising:
a supply portion comprising a stripping gas line that provides an inlet stripping gas flow, and a fuel line that provides an inlet fuel flow at a sub-ambient pressure; and
a pump mixer separator unit comprising:
a housing;
a first inlet in the housing connected to the stripping gas line;
a second inlet in the housing connected to the fuel line;
a first outlet in the housing to provide an outlet fuel flow; and
a second outlet in the housing to provide an outlet stripping gas flow,
the housing containing a first pump and a second pump integral with the housing:
the first pump in fluid communication with the stripping gas line and the fuel line to form a fuel/gas mixture flow, the first pump to draw in fuel at a sub-ambient pressure and generate a first pressure rise from the inlet fuel flow to the fuel/gas mixture flow;
the second pump in fluid communication with the first pump, wherein the second pump receives the fuel/gas mixture flow from the first pump, wherein the second pump separates the fuel/gas mixture flow into the outlet stripping gas flow and the outlet fuel flow and generates a second pressure rise from the fuel/gas mixture flow to the outlet fuel flow; and
a recirculation stripping gas flow loop in fluid communication with the second pump and the stripping gas line, the recirculation stripping gas flow loop configured to:
receive the outlet stripping gas flow from the second pump, reduce an oxygen content of the received outlet stripping gas flow, and provide the received the outlet stripping gas flow having the reduced oxygen content to the stripping gas line, wherein the first pump includes a supplemental pump feature for drawing the inlet fuel flow through the fuel line through suction at the sub-ambient pressure during operation, the first pump further including an axial impeller and a first radial impeller, the second pump including a second radial impeller, the axial impeller to draw the inlet fuel flow in conjunction with the supplemental pump feature via the fuel line and generate the first pressure rise, an output of the axial impeller connected to an input of the first radial impeller, the axial impeller to provide the inlet fuel flow to the first radial impeller, the first radial impeller to mix the inlet fuel flow with the inlet stripping gas flow from the stripping gas line to form the fuel/gas mixture flow, the first radial impeller to output the fuel/gas mixture flow to the second radial impeller, the second radial impeller separating the fuel/gas mixture flow into the outlet stripping gas flow and the outlet fuel flow and generating the second pressure rise.

13. The fuel delivery system of claim 12, wherein the first pump includes a first pump gas inlet, a first pump fuel inlet, and a first pump outlet, wherein the first pump gas inlet is in fluid communication with the stripping gas line, wherein the first pump fuel inlet is in fluid communication with the fuel line, wherein the second pump includes a second pump inlet, a second pump fuel outlet, and a second pump gas outlet; wherein the second pump inlet is in fluid communication with the first pump outlet; wherein the outlet fuel flow exits the pump mixer separator unit at the second pump fuel outlet, wherein the outlet stripping gas flow exits the pump mixer separator unit at the second pump gas outlet, and wherein the second pump inlet receives the fuel/gas mixture flow from the first pump outlet.

14. The fuel delivery system of claim 12, wherein the supplemental pump feature is a jet eductor.

15. The fuel delivery system of claim 12, wherein the aeronautical engine is a helicopter engine.

* * * * *